US006838660B2

(12) United States Patent
Duncan et al.

(10) Patent No.: US 6,838,660 B2
(45) Date of Patent: Jan. 4, 2005

(54) FIBER OPTIC SENSOR SYSTEM AND METHOD FOR MEASURING THE PRESSURE OF MEDIA

(75) Inventors: Paul Grems Duncan, Vienna, VA (US); Sean Michael Christian, Woodbridge, VA (US); John Alan Schroeder, Leesburg, VA (US)

(73) Assignee: Airak, Inc., Manassas, VA (US)

( * ) Notice: Subject to any disclaimer, the term of this patent is extended or adjusted under 35 U.S.C. 154(b) by 0 days.

(21) Appl. No.: 09/871,692

(22) Filed: Jun. 4, 2001

(65) Prior Publication Data

US 2003/0001082 A1 Jan. 2, 2003

Related U.S. Application Data

(60) Provisional application No. 60/208,564, filed on Jun. 2, 2000.

(51) Int. Cl.$^7$ .............................. G01J 1/04; G02B 6/00
(52) U.S. Cl. ........................... 250/227.14; 250/227.19; 385/13; 356/482
(58) Field of Search ....................... 250/227.14, 227.16, 250/227.18, 227.19, 227.27, 227.29; 385/12, 13; 356/35.5, 477, 482; 73/705, 715

(56) References Cited

U.S. PATENT DOCUMENTS 6,496,265 B1 * 12/2002 Duncan et al. ............ 356/35.5
2002/0003917 A1 * 1/2002 Sherrer et al. ................ 385/12

FOREIGN PATENT DOCUMENTS

JP        2000-241270 A  *  9/2000

* cited by examiner

Primary Examiner—Kevin Pyo
(74) Attorney, Agent, or Firm—Greenberg Traurig, LLP; Richard E. Kurtz, II

(57) ABSTRACT

In a preferred embodiment, the invention provides a fiber optic pressure sensor apparatus which includes a light source, a reflective sensor diaphragm movable in accordance with pressure in a medium and an optical fiber coupled to the light source for delivering a first wavefront of light to the reflective sensor diaphragm. The optical fiber has an endface which is separated from the reflective sensor diaphragm by a gap, the endface receiving a second wavefront of light reflected from the reflective sensor diaphragm. The first and second wavefronts constructively and destructively interfere to create a modulated optical signal. A spectrometer is coupled to the optical fiber for converting the optical signal into a series of digital values, and means for analyzing the digital values is provided for obtaining a measurement of the pressure in the medium. An optical coupler is preferably provided for coupling the light source, the optical fiber, and the spectrometer. A power monitoring optical detector means may be coupled to the light source by the optical coupler. A graded-index lens may be coupled to the endface of the optical fiber. The angle between the endface and a longitudinal axis of the optical fiber may be formed to be between zero and 11 degrees. A sealed or vented sensor body may be provided. In sealed embodiments, organic adhesives are preferably used to seal the sensor body. The means for analyzing the digital values preferably includes means for recovering phase information from the modulated optical signal by taking a Fourier transform of the modulated optical signal. Sensor gap measurements are then derived from this phase information.

12 Claims, 7 Drawing Sheets

FIBER OPTIC SENSOR SYSTEM AND METHOD FOR MEASURING THE PRESSURE OF MEDIA

This application claims the benefit of U.S. Provisional Patent Application No. 60/208,564, filed on Jun. 2, 2000, by inventors Paul G. Duncan et. al, the entire disclosure of which is incorporated herein by reference.

This application is related to U.S. patent application Ser. No. 09/783,390 entitled "Fiber Optic Sensors and Methods Therefor," filed Feb. 15, 2001, by inventors Paul G. Duncan et al., the entire disclosure of which is incorporated herein by reference. This application is further related to U.S. patent application Ser. No. 09/783,389 entitled "Apparatus and Method for Volumetric Dilatometry" filed Feb. 15, 2001 by inventors Paul G. Duncan, et al., the entire disclosure of which is incorporated herein by reference.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND OF THE INVENTION

1. Field of the Invention

The invention relates in general to the field of pressure sensing, and in particular to optical pressure sensors for pressure sensing of media, such as gases, liquids, or solids.

2. Related Art

In general, non-optical pressure sensors are known and operate on a principal that is based upon detecting a change in material properties as a function of an applied force. For example, many non-optical pressure sensors use a silicon diaphragm connected to a precision current source and voltage meter. As the applied force changes, the silicon diaphragm changes its resistance in proportion, causing the voltage across the diaphragm to change in direct response. Hence, this voltage allows a direct inference of the applied force, which can be directly related to applied pressure.

A major impediment to non-optical pressure sensors arises from the requirement of electrical current flow at the sensor location. For explosive environments where any form of electrical current could ignite the media, many different schemes of preventing such an event have been developed. Most anti-explosion countermeasures involve changing the environment that contains the media—double insulating the container and placing the sensor in between the two vessels—that often results in tremendous additional cost and weight to the system.

Another significant impediment to non-optical pressure sensors is the close proximity requirement between the sensor diaphragm and the signal processing electronics. In most non-optical systems, the resolution, or the smallest detectable change in pressure, is limited by electrical noise that is induced into the system due to generally harsh operating environments. To overcome this problem with induced noise, system designers have three main options: (1) shorten the distance between the pressure sensor and the signal processing electronics, (2) shield the interconnecting cable between the sensor/electronics, or (3) use a combination of both methods. Typically, (3) is implemented, resulting in increased weight due to the shielding solution as well as added complexity in co-locating the sensor and signal processing functions.

Another area of concern with respect to non-optical pressure sensing methodologies is the adhesive materials used during the manufacturing process. Many temperature and stress/strain-stabilized epoxies use organic binders that release organic compounds as they age. For small-volume pressure measurements this outgassing phenomenon causes the total pressure within the sensor vessel to increase, contributing significantly to the overall error of the system. Additionally, in many instances, these gaseous organic compounds can react with the media they are sensing, causing unwanted chemical reactions, potentially giving rise to self-ignition.

Another major impediment to non-optical pressure sensor methodologies is the long-term stability of such sensors. In general, the majority of non-optical pressure sensing methodologies are termed relative—the measurement is valid for as long as power is applied to the system. If the input power to the system fluctuates significantly, the stability of the measurement system is adversely affected, requiring recalibration of the sensor element. Furthermore, removing power from the system results in complete loss of the calibration reference; this also requires recalibration upon re-energizing the equipment. Both of these scenarios prevent the long-term monitoring of an environment with respect to pressure.

OBJECTS AND SUMMARY OF THE INVENTION

It is therefore an object of the invention to provide an improved system and method for measuring pressure in gas, liquid, or solid media.

It is a further object of the invention to provide an optical system and method for measuring pressure which prevents self-ignition through electrical current discharge.

It is a further object of the invention to provide an optical system and method for measuring pressure wherein the signal processing electronics and the pressure sensor head can be separated by large distances.

It is a further object of the invention to provide an optical system and method for measuring pressure which avoids the exposure of organic adhesives to the sensing media via the sensor head, thereby preventing contamination of the sensing media.

It is a further object of the invention to provide an optical system and method of measuring pressure which minimizes or eliminates problems associated with long-term drift of the sensor element.

In a preferred embodiment, the invention provides a fiber optic pressure sensor apparatus which includes a light source, a reflective sensor diaphragm movable in accordance with pressure in a medium and an optical fiber coupled to the light source for delivering a first wavefront of light to the reflective sensor diaphragm. The optical fiber has an endface which is separated from the reflective sensor diaphragm by a gap, the endface receiving a second wavefront of light reflected from the reflective sensor diaphragm. The first and second wavefronts constructively and destructively interfere to create a modulated optical signal. A spectrometer is coupled to the optical fiber for converting the optical signal into a series of digital values, and means for analyzing the digital values is provided for obtaining a measurement of the pressure in the medium. An optical coupler is preferably provided for coupling the light source, the optical fiber, and the spectrometer. A power monitoring optical detector means may be coupled to the light source by the optical coupler. A graded-index lens may be coupled to the endface of the optical fiber. The angle between the endface and a longitudinal axis of the optical fiber may be formed to be between zero and 11 degrees. A sealed or vented sensor body may be provided. In sealed embodiments, organic adhesives are preferably used to seal the sensor body. The means for analyzing the digital values preferably includes means for recovering phase information from the modulated optical signal by taking a Fourier transform of the modulated optical signal. Sensor gap measurements are then derived from this phase information.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
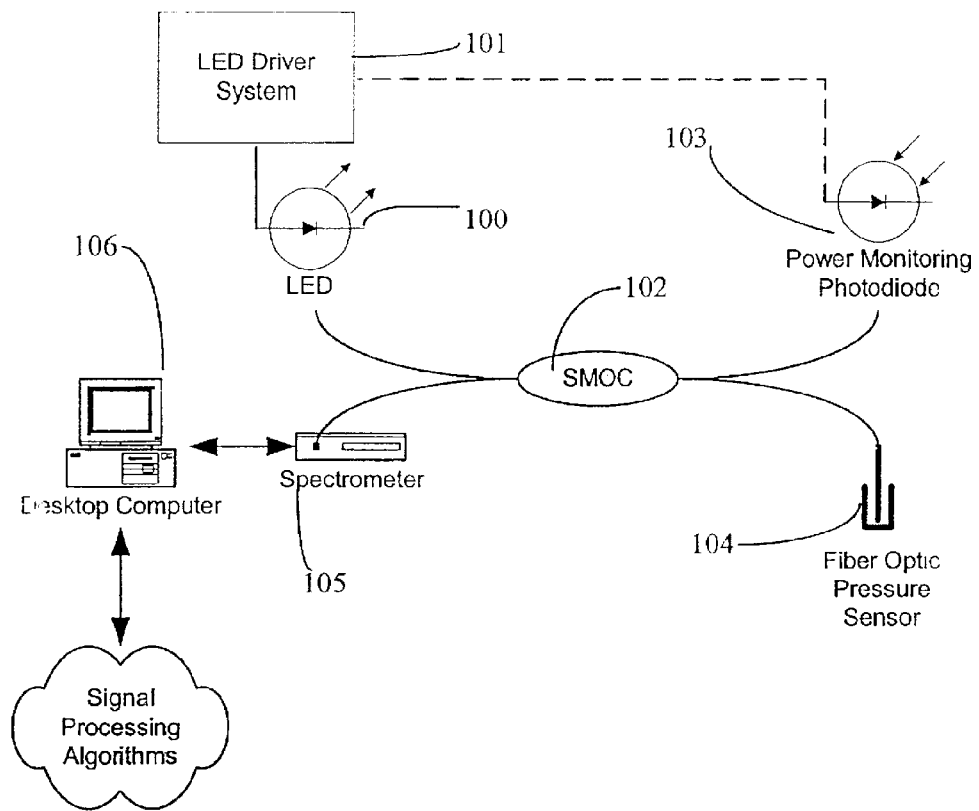
FIG. 1 shows the overall system block diagram for the fiber optic pressure measurement system.
Figure 3:
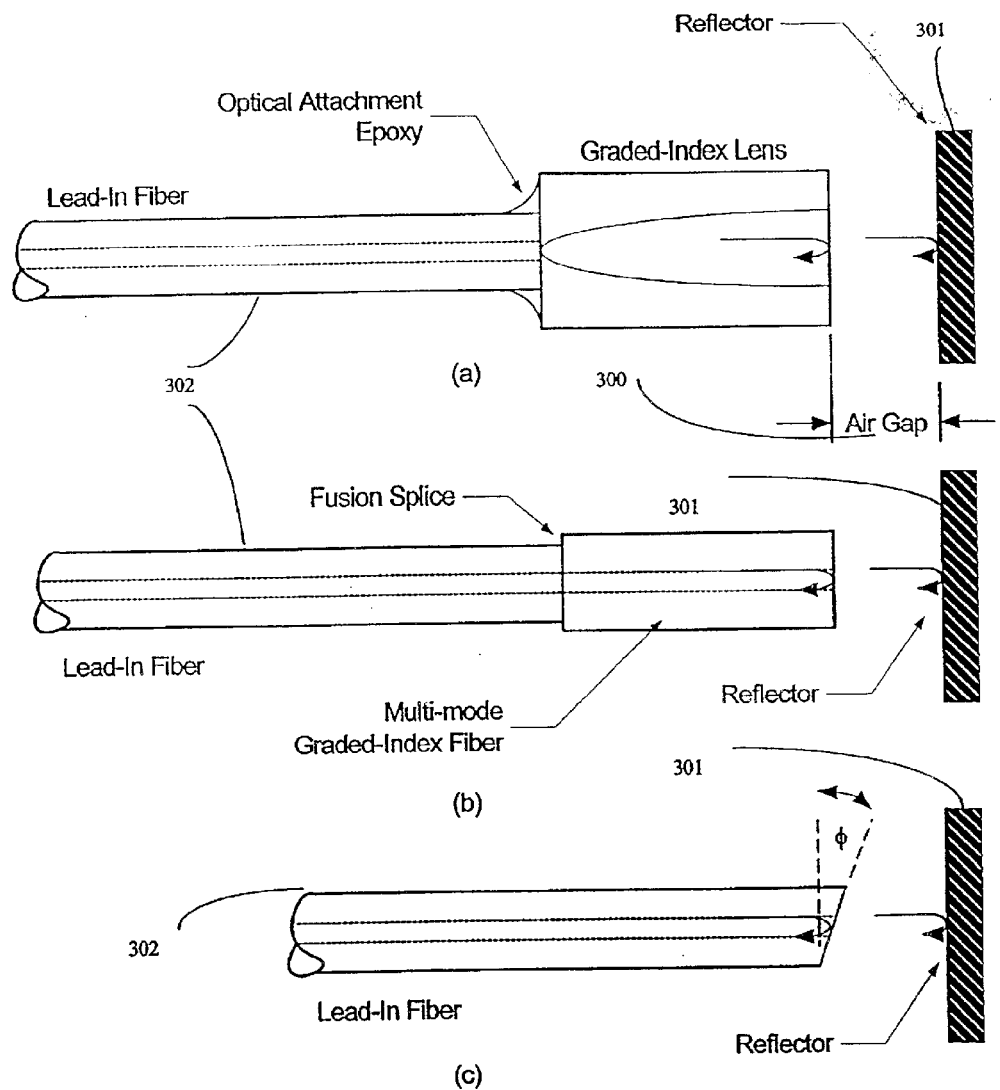
FIG. 3 shows various two-beam interferometric sensor configurations that can sense changes in the gap distance between the optical system and the reflecting surface.
Figure 4:
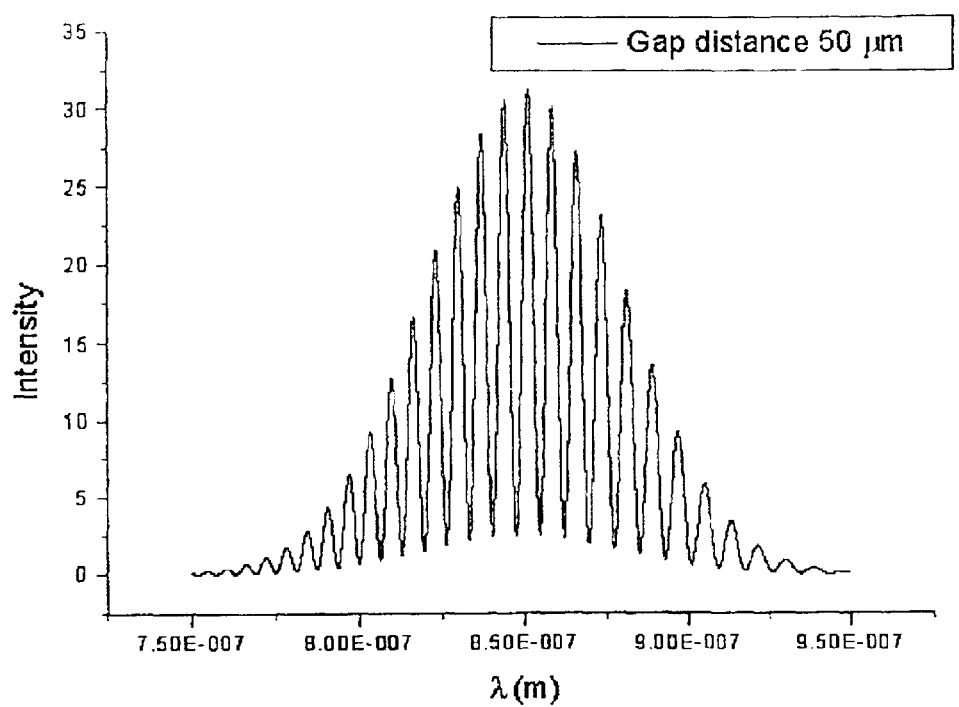
FIG. 4 shows the signal response of the wavelength modulated sensor system for a gap of 50.0 $\mu$m.

FIG. 1 shows a block diagram illustrating the overall operation of the hardware and software of the system in accordance with a preferred embodiment. Light, generated by a light emitting diode (LED) 100 and under the control of a LED driver system 101, is launched into one arm of a −3 dB single mode optical coupler (SMOC) 102. Correct operation of the system has been demonstrated using a white light LED (spectra provided in FIG. 2), a wide-band LED centered at 740 nm with a full-wave-half-maximum (FWHM) of 35 nm, and a super-luminescent LED (SLED) centered at 850 nm with a FWHM of 21 nm. The light energy, after traveling through the coupler 102, is attenuated by 3 dB and is sent simultaneously to a power monitoring photodiode 103 and to a fiber optic pressure sensor 104. The energy that falls upon the power monitoring photodiode 103 is used to regulate and stabilize the LED driver 101 current so that intensity fluctuations are kept to a minimum. The energy that travels to the fiber optic pressure sensor 104 is modulated by the gap 300 between the fiber optic endface and the sensor diaphragm 301 (as shown in FIG. 3), resulting in a modulated Gaussian waveform that is represented in FIG. 4. The modulated light energy then travels back towards the source, and is split again in the SMOC 102 with one-half the incident light now traveling to the spectrometer 105. The spectrometer 105 converts the modulated optical signal into a series of digital values that are stored by a desktop computer 106. These digital values are processed in the manner described below to return a value that represents the overall gap between the fiber endface within the sensor as well as the diaphragm 301.

Note that the sensor is shown directly connected to the SMOC 102 for illustrative purposes. If high-quality single mode optical fiber is utilized, the sensor can practically be located several hundreds of meters from the signal processing system with no loss in system performance. This feature has the added benefit of allowing the processing equipment to reside in locations that are temperature controlled, or are lower electromagnetic interference (EMI) environments, thereby reducing the amount of noise induced into the system. This improves the overall system resolution.

Figure 2:
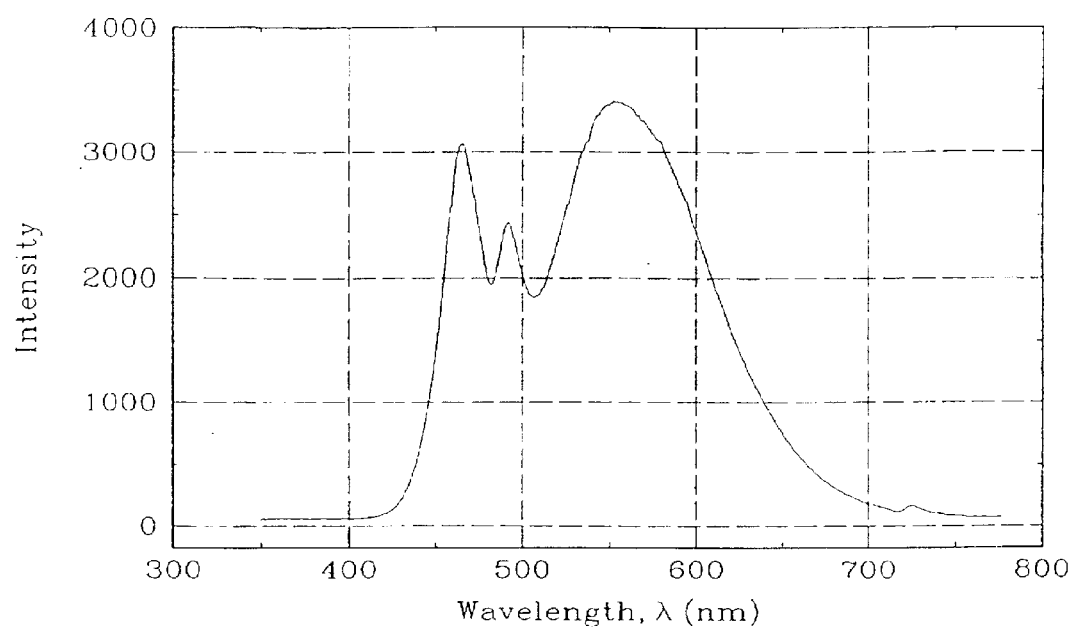
FIG. 2 shows the white light spectrum produced from a new line of LED sources from Hewlett-Packard.

FIG. 2 shows the white light spectrum produced from a new line of LED sources from Hewlett-Packard. Close examination of the spectra reveals that several materials within the LED are emitting, creating a tri-modal profile. FWHM loses its meaning in this context, due to the non-Gaussian emission profile, but rough, visual estimates of the bandwidth are greater than 150 nm. This is significant: as the emission bandwidth of the optical source increases the resolution of the signal processing algorithms increases, within certain practical constraints. Hence, in the preferred embodiment, a source with an emission bandwidth as wide as possible is desired. Despite this statement, a source as narrow as 21 nm has been implemented with satisfactory results.

FIG. 3 shows three sensor configurations that have been implemented. Each has advantages and disadvantages, depending upon the overall change in gap 300 distance (dynamic range) and other sensor considerations. View (a) shows a graded index (GRIN) lens mounted on the end of a SMOF. Light propagates towards the right from the left, and is collimated within a quarter-pitch GRIN lens which has been ground to the center frequency of the incident wavefront. View (a) is used in applications where the total dynamic range of the sensor subsystem is greatest. View (b) is another embodiment of that shown in view (a), and is implemented when the sensor profile (diameter) must be kept as small as possible.

View (c) of FIG. 3 is the preferred embodiment of the invention. Light energy propagates from the left towards the right, and when the initial glass-vacuum (or air) interface is encountered, a Fresnel reflection is established. Approximately 96% of the incident power is transmitted into the air gap region 300, where it strikes the reflector 301, in this case the pressure diaphragm. 100% of the energy is reflected, and a portion is captured by the lead-in fiber 302. These two wavefronts constructively and destructively interfere, creating the modulated spectra shown in FIG. 4. An angle of zero to 11 degrees can be placed upon the fiber endface to improve fringe contrast.

FIG. 4 shows the signal response of the wavelength modulated sensor system for an air gap of 50.0 $\mu$m. Due to the approximate Gaussian profile of the LED optical source, the signal response is a Gaussian amplitude modulated fringe pattern. As the length of the air gap increases, the number of wavelengths which can satisfy the condition of in-phase addition, after being reflected from the reference interface and the sensing interface, also increases, increasing the number of fringe peaks, and decreasing the distance (in terms of wavelength) between adjacent fringe peaks. Note that the frequency of occurrence of fringe peaks decreases gradually towards the higher end of wavelength values, i.e., there is a chirp present in the frequency of the fringe pattern. This chirp is due to the fact that the condition of in-phase addition, after being reflected from the reference interface and the sensing interface, is met more frequently (in terms of wavelength distances) at lower wavelengths, and gradually decreases with the increase of wavelength.

Note that the modulated profile shown in FIG. 4 is unique: only the gap corresponding to 50 μm will produce this optical signal. This is significant, because power can be interrupted to the system with no loss in accuracy. Hence, drift due to system aging and input power fluctuations are minimized, if not completely eliminated.

Figure 5:
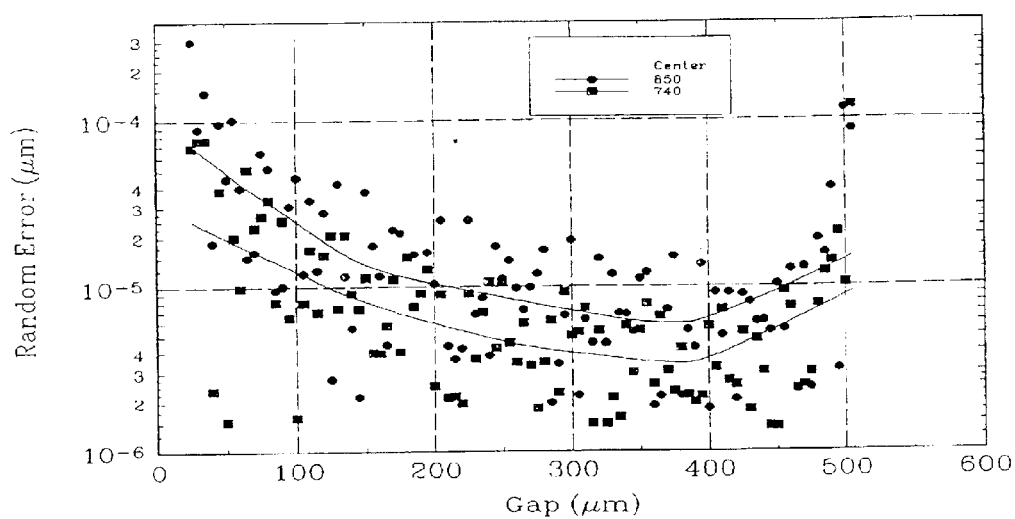
FIG. 5 shows the random error as a function of gap for two source/spectrometer center wavelengths, 740 and 850 nm.

FIG. 5 shows the results of a Monte-Carlo simulation to determine the random error (equivalent to the resolution) of this optical method in determining absolute displacement and ultimately pressure. In these simulations effects of signal-to-noise ratio (SNR), sensor gap, and center wavelength of the source and spectrometer were considered. As can be seen from this Figure, a factor of two results in the improvement in resolution when the source/spectrometer wavelength is moved from 850 nm to 740 nm. Thus, it is preferred to use light sources and spectrometers with lower center wavelengths if higher resolution is desired.

Signal processing plays an important role in the overall recovery of the absolute displacement/pressure signal. To achieve higher accuracy, the phase information from the spectral signal can be recovered. This is accomplished by taking the Fourier transform of the spectral signal $S(v)$:

$$G(\delta) = \int S(v) e^{-i 2\pi v \delta/c} d\delta \quad (1)$$

The function $G(\delta)$ consists of a zero harmonic corresponding to the spectral distribution of the source and a couple of first harmonics corresponding to the fringe pattern. The phase information is contained in the first harmonics. A Fourier transform is taken of $g(\delta)$ which is $G(\delta)$ with the zero harmonic subtracted out:

$$f(v) = 2 \int g(\delta) e^{i 2\pi v \delta/c} dv \quad (2)$$

The complex function $f(v)$ gives the proper relation between phase $\phi$ and light frequency $v$. The sensor gap is determined from the derivative of $\partial \phi / \partial v$:

$$g = \left(\frac{\partial \varphi}{\partial v}\right) \frac{c}{4\pi} \quad (3)$$

Given this, and after some manipulation, the maximum gap that can be processed with the algorithm given:

$$g_{max} = \frac{Nc}{4(v_1 - v_N)} \quad (4)$$

where N is the number of pixels of the CCD in the spectrometer, c is the speed of light in a vacuum, $v_1$ is the frequency of light at pixel 1, and $v_N$ is the frequency of light at last pixel. Hence, for a spectrometer with 2048 pixels and scan of 750 to 950 nm, the theoretical maximum detectable gap is 1.8 mm. In reality, due to electronic noise, the gap is less, due to signal to noise considerations within the electro-optic detection subsystems. From the viewpoint of the pressure sensors, the main interest is minimum detectable gap distance.

Figure 6:
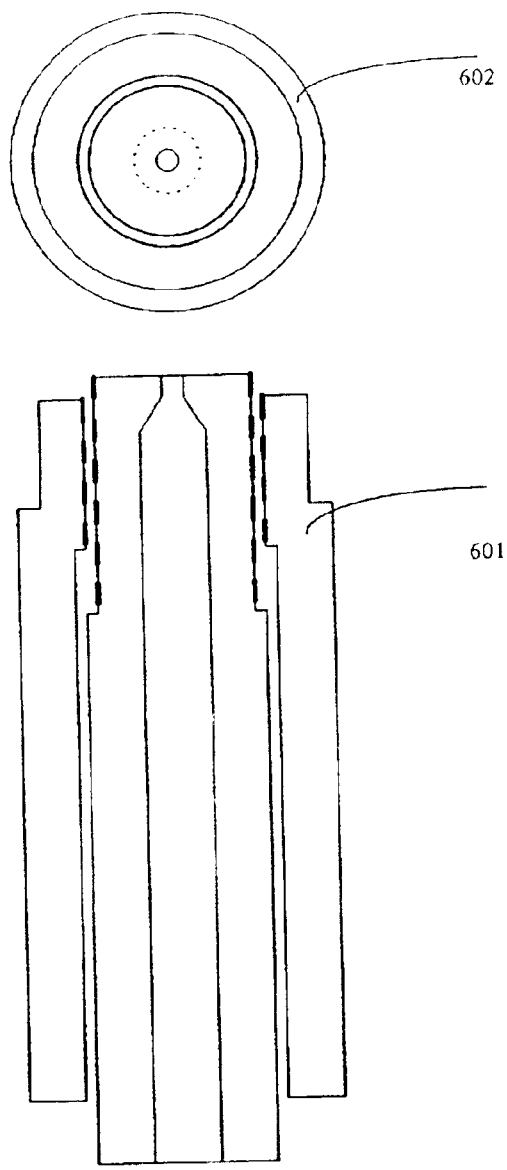
FIG. 6 shows a detailed mechanical drawing of the fiber optic pressure sensor probe body and insert
Figure 7:
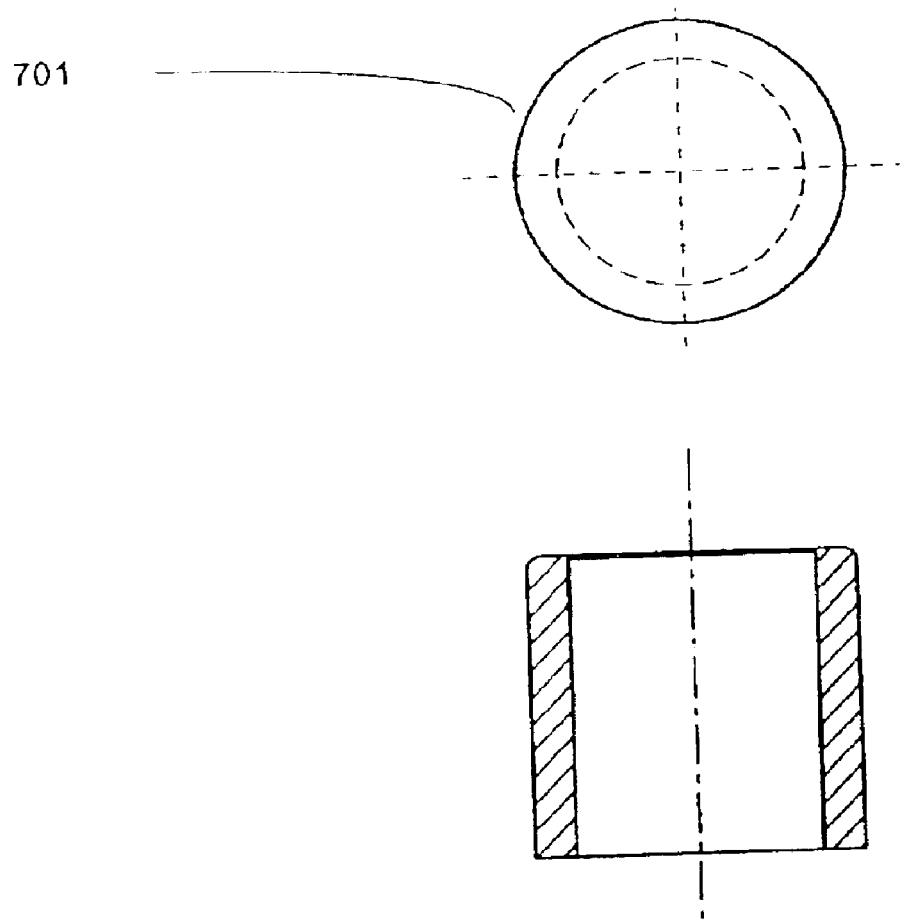
FIG. 7 shows a detailed mechanical drawing of the fiber optic pressure sensor diaphragm assembly.

FIG. 6 and FIG. 7 show the preferred embodiment of the fiber optic probe body and insert as well as the pressure diaphragm head assembly. In the preferred embodiment both assemblies are fabricated from the same low-to-zero coefficient of thermal expansion (CTE) material such as COVAR or INVAR, to minimize the modulation effects regarding change in temperature on the sensor housing. The sensor assembly is comprised of two or three parts. A three part embodiment is preferred, having a sensor body 601, a diaphragm cap 602 and a diaphragm head 701, which are independently fabricated and then assembled. A two-part assembly contains a sensor body 601 and a diaphragm head 701 already integrated into the diaphragm cap 602 and is less favorable because it is more difficult to position the optical fiber in the sensor assembly.

In one embodiment of the present invention, the sensor is vented to normal atmospheric pressure. However, since the body is vented to the atmosphere, it is sensitive to barometric pressure changes, which can be accounted for in the calculation process by adding a barometer. Venting the body reduces drift significantly by eliminating internal gasses from accumulating as opposed to a sealed embodiment. In a preferred embodiment, the sensor is sealed with epoxy at atmospheric pressure, with no pressure differential across the epoxy boundary, thus mitigating drift due to diffusion of air into the sensor head. Although the gas volume makes the sensor sensitive to $P = nRT/V$ changes, this is compensated for in the pressure calculation algorithm using a thermocouple input. Temperature will affect the sensor, but can also be accounted for. Several other sealed embodiments are also contemplated by the present invention. In one embodiment, the diaphragm cap is attached with epoxy to the sensor body and the optical fiber insert positioned in the assembly and sealed with epoxy under vacuum conditions. In another embodiment the diaphragm cap is soldered onto the sensor body. The optical fiber assembly is sealed under vacuum with a nominal amount of adhesive.

In any embodiment, whether or not it is vacuum sealed, assembly using epoxy is accomplished in the following manner: After verifying proper tolerances, the pressure diaphragm cap assembly, including the diaphragm head, is soldered, braised, or welded to the fiber optic probe body. The seal that is formed may be a vacuum seal. Once the assembly has been joined, a small amount of heat-cure epoxy is placed upon the longitudinal portion of the fiber near the endface. This fiber, prepared as shown in FIG. 3(c), is inserted within the fiber optic probe body, and the entire assembly is placed within a vacuum oven. After verifying the presence of a proper optical signal, if the embodiment requires a vacuum, the oven is pumped to as low a pressure as is possible (approximately 15 torr absolute) and the temperature is increased to 60° C., where it is held for at least one hour. Next, the temperature is increased at 20° C. intervals for 30 minutes dwell through 120° C., which allows the epoxy to cure properly. If a vacuum was required, then the vacuum is released and the oven is allowed to cool through normal radiation and convective loss mechanisms.

Note that the probe configuration preferably does not expose any epoxy to the sensing environment. This prevents the sensor from outgassing and potentially contaminating the surrounding media. Furthermore, with no direct exposure of optical energy, nor (by design) the presence of any electrical signal, the chance of the sensor causing an ignition of volatile media is eliminated. Finally, due to the sealed nature of the probe, the entire assembly can be used to directly monitor gasses, liquids, or solids, as required. In the preferred embodiment the sensor assembly has been designed to fit a ½" inner-diameter Swagelok™ vacuum pressure fitting.

In any embodiment of the invention it is desirable to eliminate the use of organic adhesives from the assembly process due to outgassing. Alternative means of adhering include the use of metal coated quartz ferrules, glass fusion, solder, powdered silica, silica diaphragms and the use of a $CO_2$ laser system.

The interferometric gap calculation includes calibration coefficients for sensor, spectrometer, and temperature variances. The core code for the system software can be found in Appendix A attached hereto. Appendix A contains a file containing the core operations of the signal processing algorithms in the "G" language. The code can be implemented in an environment running LabView. A typical header file for such code would contain the following statement:

(extern double g_dPressureCalc (double[ ], double[ ], double );)

The software provides a user interface which can be utilized to view and modify parameters. A user of the system is able to view a histogram plot of the measured pressure and temperature. A create data file option enables the end user to record system data by saving a file to disk. When a file is saved, a user is able to enter comments associated with the data file. Also, a user may enter various coefficients, such as those of the spectrometer, temperature and pressure. Additionally, a user may change the spectrometer parameters. Such parameters include the detector integration rate and scans to average. The detector integration rate is the time over which the detector integrates. The higher the detector integration rate, the larger the signal. The scans to average is the number of spectra averaged by the spectrometer prior to each pressure calculation.

The methods for signal processing taught in U.S. patent application Ser. No. 09/783,389 entitled "Apparatus and Method for Volumetric Dilatometry" filed Feb. 15, 2001 by inventors Paul G. Duncan, et al., are applicable to the present invention and the entire disclosure of that application is incorporated herein by reference.

The system specifications in a preferred embodiment are as follows:

| DEFAULT VALUES | |
|---|---|
| Integration Time | 175 ms |
| Scans to Average (Pressure) | 5 scans |
| ENVIRONMENTAL SPECIFICATIONS | |
| Power Source | 120 VAC +− 5V |
| Operating Temperature | 20° C.–60° C. |
| Fiber Lead Bend Radius | 6" |
| PERFORMANCE SPECIFICATIONS | |
| Pressure Range | 50–650 Torr |
| Resolution | 0.5 Torr |
| Accuracy | =/− 2.0 Torr |
| CALIBRATION COEFFICIENTS | |
| Spectrometer | |
| Coefficient 1 | 0.26138 |
| Coefficient 2 | −0.000015 |
| Coefficient 3 | 679.3 |
| Temperature | |
| Coefficient 1 | −1.16712 |
| Coefficient 2 | 0.06003 |
| Pressure | |
| Coefficient 1 | 17.64879 |
| Coefficient 2 | −.044552 |
| Coefficient 3 | 0.01117 |
| Coefficient 4 | −2.87871E-4 |

The embodiments of the invention in which an exclusive property or privilege is claimed are defined as follows:

1. A fiber optic pressure sensor apparatus for measuring pressure in a medium, comprising:

a light source;

a reflective sensor diaphragm movable in accordance with said pressure in said medium;

optical fiber coupled to said light source for delivering a first wavefront of light to said reflective sensor diaphragm, said optical fiber further comprising:

an endface which is separated from said reflective sensor diaphragm by a gap, said endface receiving a second wavefront of light reflected from said reflective sensor diaphragm, said first and second wavefronts constructively and destructively interfering to create a modulated optical signal;

spectrometer means coupled to said optical fiber for converting said optical signal into a series of digital values; and, means for analyzing said digital values to obtain a measurement of said pressure in said medium.

2. The fiber optic pressure sensor apparatus in accordance with claim 1, further comprising:

an optical coupler for coupling said light source, said optical fiber, and said spectrometer means.

3. The fiber optic pressure sensor apparatus in accordance with claim 2, further comprising:

a power monitoring optical detector means coupled to said light source by said optical coupler; and, means for regulating said light source in accordance with a signal from said power monitoring optical detector means.

4. The fiber optic pressure sensor apparatus in accordance with claim 1, wherein said optical fiber comprises a single-mode optical fiber.

5. The fiber optic pressure sensor apparatus in accordance with claim 1, further comprising: a graded-index lens coupled to said endface of said optical fiber.

6. The fiber optic pressure sensor apparatus in accordance with claim 1, wherein the angle between said endface and a longitudinal axis of said optical fiber is between zero and 11 degrees.

7. The fiber optic pressure sensor apparatus in accordance with claim 1, further comprising a sensor body.

8. The fiber optic pressure sensor apparatus in accordance with claim 7, wherein said sensor body is vented to normal atmospheric pressure.

9. The fiber optic pressure sensor apparatus in accordance with claim 7, wherein said sensor body is sealed at atmospheric pressure.

10. The fiber optic pressure sensor apparatus in accordance with claim 7, wherein said sensor body is sealed using an organic adhesive.

11. The fiber optic pressure sensor apparatus in accordance with claim 1, wherein said diaphragm comprises a diaphragm cap and a diaphragm head.

12. The fiber optic pressure sensor apparatus in accordance with claim 1, wherein said means for analyzing comprises:

means for recovering phase information from said modulated optical signal by taking a Fourier transform of said modulated optical signal; and, means for deriving a sensor gap measurement from said phase information.

* * * * *